United States Patent [19]

Hatanaka et al.

[11] Patent Number: 4,620,177
[45] Date of Patent: Oct. 28, 1986

[54] WINKER DEVICE

[75] Inventors: Kaoru Hatanaka, Saitama; Yukio Miyamaru, Tokyo, both of Japan

[73] Assignee: Honda Giken Kogyo Kabushiki Kaisha, Tokyo, Japan

[21] Appl. No.: 691,108

[22] Filed: Jan. 14, 1985

[30] Foreign Application Priority Data

Jan. 13, 1984 [JA] Japan ................................. 59-4601

[51] Int. Cl.⁴ .......................... B60Q 1/46; B60Q 1/00; B60Q 1/26; B62J 6/00
[52] U.S. Cl. ................................ 340/81 R; 340/134; 340/67; 340/73; 315/77
[58] Field of Search ................... 340/81 R, 115, 135, 340/73, 55, 56, 67, 83, 89; 315/77, 80, 82, 83; 307/10 LS, 10 R, 9

[56] References Cited

U.S. PATENT DOCUMENTS

| 3,407,385 | 10/1968 | Gopalan et al. | 340/81 R |
| 3,740,714 | 6/1973 | Ballou | 340/67 |
| 4,087,784 | 5/1978 | West | 340/81 F X |
| 4,290,048 | 9/1981 | Cutlip et al. | 340/73 X |
| 4,403,211 | 9/1983 | Shibata | 340/56 X |

Primary Examiner—James L. Rowland
Assistant Examiner—Anne Marie F. Capati
Attorney, Agent, or Firm—Armstrong, Nikaido, Marmelstein & Kubovcik

[57] ABSTRACT

A winker device comprising a left winker having a left winker lamp for a turning to the left and a left position lamp, a right winker having a right winker lamp for a turning to the right and a right position lamp, a winker switch means adapted for a switching for the left and right position lamps, and a position lamp relay for connecting a power source to the left and right position lamps.

The position lamp relay opens when the winker switch means is operated for the turning to either the left or right.

The invention comprises a winker device, in which, in a travelling state, a pair of position lamps are constantly lit on both sides and, in a cornering state, either of the position lamps at the corresponding side to a winker to be then caused to flash is extinguished while the winker is flashing, thus favorably reducing the power consumption of a battery.

12 Claims, 10 Drawing Figures

WINKER DEVICE

BACKGROUND OF THE INVENTION

1. Field of the Invention

The present invention relates generally to a winker device. More particularly, the invention relates to a winker device, such as for motorcycles, of the type which includes left and right winkers each respectively having disposed therein a position lamp as well as a winker lamp.

2. Description of Relevant Art

In recent years, there have been proposed various position lamps paired to be provided such as in a motorcycle on both sides thereof, to be constantly lit so as to serve in the form of a pair of indication lamps for visually indicating the transverse width of such vehicle.

In some cases, in a conventional winker provided such as in a motorcycle, such a position lamp is disposed in combination with a winker lamp.

In winker devices of such composition, in which a position lamp is constantly lit, when a winker lamp flashes to indicate a cornering travel, there appears such a state that the winker lamp and the position lamp are concurrently lit. Accordingly, for contrasting the winker lamp with the position lamp, it becomes necessary to render the brightness of the winker lamp higher than that of the position lamp, thus adversely affecting the power saving of a battery.

The present invention has been achieved to effectively overcome such problems in a conventional winker device.

SUMMARY OF THE INVENTION

According to the present invention, there is provided a winker device comprising a left winker having a left winker lamp adpated for a turning to the left and a left position lamp, a right winker having a right winker lamp adapted for a turning to the right and a right position lamp, a winker relay connected to a power source, for intermittently supplying an electric power to the left and right winker lamps, a first select switch interposed between the winker relay and the left and right winker lamps, for connecting the winker relay constantly to either of the left and right winker lamps, a position lamp relay disposed between the power source and the left and right position lamps, for connecting and disconnecting the power source to and from the left and right position lamps, a winker switch means for supplying, in accordance with a manual operation, a first signal to the winker relay and the position lamp relay, the first signal representing either of the turning to the left and the turning to the right, and, in accordance with at least another manual operation, a second signal to the winker relay and the position lamp relay, the second signal representing a completed state of the turning, and the first select switch being operatively connected to the winker switch means to connect the winker relay, in accordance with the manual operation giving the first signal of the winker switch means, to either of the left and right winker lamps.

Moreover, according to the present invention, there is provided a winker device comprising a left winker having a left winker lamp adapted for a turning to the left and a left position lamp, a right winker having a right winker lamp adapted for a turning to the right and a right position lamp, a winker relay connected to a power source, for intermittently supplying an electric power to the left and right winker lamps, a first select switch interposed between the winker relay and the left and right winker lamps, for connecting the winker relay constantly to either of the left and right winker lamps, a position lamp relay disposed between the power source and the left and right position lamps, for connecting and disconnecting the power source to and from the left and right position lamps, and a winker switch means for supplying a first signal to the winker relay and the position lamp relay in accordance with a manual operation, the first signal representing either of the turning to the left and the turning to the right, and a second signal to the winker relay and the position lamp relay, the second signal representing a completed state of the turning, wherein, when the first signal is supplied from the winker switch means, at least either of the left and right position lamps is made extinguished in correspondence to the first signal and, when the second signal is supplied from the winker switch means, the above-said either of the left and right position lamps, as extinguished, is made lit.

Accordingly, an object of the present invention is to provide a winker device, in which, in a travelling state, a pair of position lamps are constantly lit on both sides and, in a cornering state, either of the position lamps at the corresponding side to a winker to be then caused to flash is extinguished while the winker is flashing, thus favorably reducing the power consumption of a battery.

The above and further objects, details and advantages of the present invention will become apparent from the following detailed description of a preferred embodiment of the invention when read in conjunciton with the accompanying drawings.

DETAILED DESCRIPTION OF PREFERRED EMBODIMENT

Figure 1:
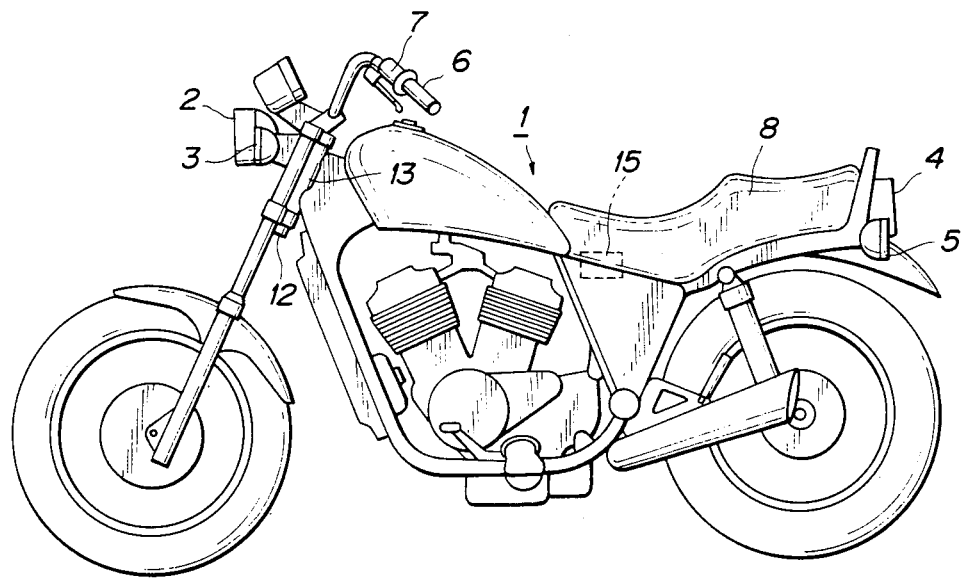
FIG. 1 is a schematic side view of a motorcycle provided with a winker device according to the preferred embodiment of the invention.

Referring first to FIG. 1, designated at reference numeral 1 is the entirety of a motorcycle provided with a winker device according to the preferred embodiment of the invention. The motorcycle 1 has, at the left and right of a head light 2, left and right front winkers 3, respectively, and, in the vicinity of a tail light 4, at the left and right of a vehicle body, left and right rear winkers 5, respectively. The front winkers 3 as well as the rear winkers 5 are adapted to flash, when the motorcycle 1 is cornering, at the cornering side, thus indicating the turning direction of the motorcycle 1, whereas a manual operation for having the front and rear winkers 3, 5 flash is to be made by a driver (not shown) at a winker switch 7 provided in the vicinity of a grip portion of a handle bar 6. Designated at reference numeral 15 is a winker relay for triggering the winkers 3, 5 to flash, the winker relay 15 being disposed beneath a driver's seat 8.

The winker device includes left and right position indicators and a winker control unit 12.

Figure 3:
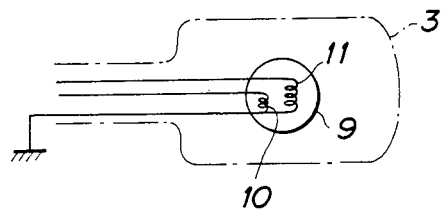
FIG. 3 is an internal connection diagram of a winker of the winker device.

As shown in FIG. 3, each position indicator comprises a filament 10 connected in parallel with a filament 11 of a winker lamp 9 inside of front winker 3.

Referring again to FIG. 1, the winker control unit 12 is disposed in the vicinity of the lower end of a head tube 13, and comprises an electronic circuit adapted to automatically put out flashing ones of the front and rear winkers 3, 5, upon completion of a cornering state, in a later-described manner.

Figure 2:
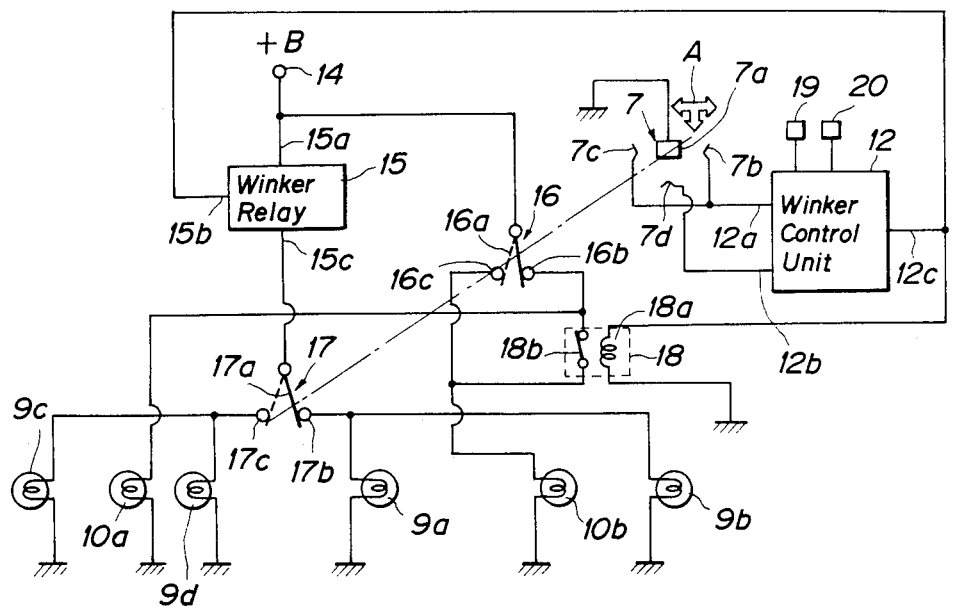
FIG. 2 is a circuit diagram of the winker device.

Speaking electrical matter, the winker device comprises a wired system including the winker lamps 3, 5, left and right position lamps as the position indicators, the winker switch 7, the winker control unit 12, and later-described other components, as shown in FIG. 2.

An electric circuit of the system will now be described with reference to FIG. 2. Designated at reference numeral 14 is a power supply terminal. To the terminal 14 is applied a controlled voltage of a predetermined level from a power source (not shown). The terminal 14 is connected to a power supply input terminal 15a of the winker relay 15 and to a mobile contact 16a of a position lamp switch 16. From the winker relay 15 is intermittently supplied, through an output line 15c thereof, an electric power for causing the winkers 3, 5 to flash, when a voltage applied to a signal input terminal 15b of the winker 15 is continuously changed to a "low" level, which voltage is normally kept at a "high" level.

Moreover, in FIG. 2, designated at reference character 9a is a right front winker lamp, 9b is a right rear winker lamp, 9c is a left front winker lamp, and 9d is a left rear winker lamp. Between the output line 15c of the winker relay 15 and respective power supply side lines of the winker lamps 9a, 9b, 9c, 9d, there is interposed a select switch 17 for selecting to have flash the right front and rear winker lamps 9a, 9b or the right front and rear winker lamps 9c, 9d. The switch 17 has a mobile contact 17a and right and left terminals 17b, 17c. The mobile contact 17a is connected to the output line 15c of the winker relay 15; the right terminal 17b, to the power supply side lines of the right front and rear winker lamps 9a, 9b; and the left terminal 17c, to the power supply side lines of the left front and right winker lamps 9c, 9d.

Also the position lamp switch 16 has right and left terminals 16b, 16c, besides the mobile contact 16a. The right terminal 16b is connected directly to a left front position lamp 10a and through a position lamp relay 18 to a right front position lamp 10b; and the left terminal 16c, directly to the right position lamp 10b and through the relay 18 to the left position lamp 10a. The position lamp relay 18 comprises an electro-magnetic coil 18a and a contact 18b adapted to close when the coil 18a is energized. This embodiment employs no rear position lamps, although such position lamps may be preferably employed.

Further, the winker switch 7 has an operating element 7a to be operated by the driver, the element 7a being electrically grounded, and right, left, and front contacts 7b, 7c, 7d. As illustrated at reference character A, the operating element 7a has three operating directions, that is, to the left, to the right, and to the front. When operated in any of the operating directions, the operating element 7a once contacts with corresponding one of the right, left, and front contacts 7b, 7c, 7d, before being automatically caused to return in a resilient manner to a neutral position at which the element 7a is not in contact with any of the contacts 7b, 7c, 7d.

Furthermore, the mobile contact 16a of the position lamp switch 16 is constantly brought into contact with either of the right and left terminals 16b, 16c thereof, and the mobile contact 17a of the winker select switch 17 is in a similar relation to the right and left contacts 17b, 17c thereof. When the mobile contact 16a is put in contact with right or left one of the contacts 16b, 16c, also the mobile contact 17a is necessarily put in contact with corresponding one of the right and left contacts 17b, 17c. For example, as shown in FIG. 2 by the solid line, when the mobile contact 16a is selected to be in contact with the right terminal 16b, also the mobile contact 17a is put in contact with the right contacts 17b.

In the foregoing arrangement, when the operating element 7a of the winker switch 7 is operated to the right or left, the mobile contacts 16a, 16b of the position lamp switch 16 and the select switch 17 are both moved, in an interlocked manner with the operating element 7a, to be put in contact with the right or left contacts 16b, 17b or 16c, 17c, respectively. Concurrently, with the operating element 7a momentarily put in contact with the right or left contacts 7b, 7c, a signal input terminal 12a of the winker control unit 12 momentarily has a "low" level voltage, whereby the control unit 12 recognizes that the operating element 7a is operated to the right or left.

On the other hand, when the operating element 7a is operated to the front, thus getting a momentary contact with the contact 7d, then another signal input terminal 12b of the control unit 12 momentarily has a "zero" level voltage, which permits a later-described manual cencellation to be effected.

Incidentally, the winker control unit 12 receives at the input side thereof, besides voltage signals from the winker switch 7 at the input terminals 12a, 12b, respective signals from a steering angle sensor 19 and a travelling distance sensor 20, and has at the output side thereof a signal output terminal 12c for outputting a control signal to the signal input terminal 15b of the winker relay 15 and for supplying an exciting current to the coil 18a of the position lamp relay 18. Moreover, as already referred in conjunction with FIG. 3, the left front winker lamp 9c and the left front position lamp 10a, as well as the right front winker lamp 9a and the right front position lamp 10b, constitute together a single front lamp, whereas in the control circuit of FIG. 2 such a single lamp is equivalently shown as the combination of a winker lamp and a position lamp.

The function of the circuit of FIG. 2, as a whole, will now be described. In a travelling state of the motorcycle 1, while the operation element 7a of the winker switch 7 is not operated to be in contact with any of the contacts 7b, 7c, 7d, that is, when it is in the neutral position thereof, then the winker switch 7 continuously outputs a "high" level voltage, whereby the winker relay 15 is left in a stop state thereof and the coil 18a of the position lamp relay 18 is continuously energized to thereby hold the contact 18b in a close state thereof. The mobile contact 16a of the position lamp switch 16 is connected to the right contact 16b, so that the left and right position lamps 10a, 10b are both lit. In such state, although also the mobile contact 17a of the select switch 17 is connected to the right contact 17b, the winker relay 15 as stopped will not permit the right front and rear winker lamps to flash.

When the operating element 7a is operated to indicate a turning to the left of the motorcycle 1, then the mobile contacts 16a, 17a movable in accordance with the operation of the element 7a are turned to the left to have respective positions shown in FIG. 2 by the broken line, so that a temporary contact of the element 7a with the left contact 7c temporarily produces the "zero" level voltage at the signal input terminal 12a of the winker control unit 12. The output terminal 12c of the control unit 12 is then to be kept at the "low" level voltage, which voltage is input to the input terminal 15b of the winker relay 15, whereby a power supply function of the winker relay 15 is put in service and the coil 18a is deenergized to open the contact 18b. As a result, the right position lamp 10b is left lit and the left position lamp 10a is extinguished, while the left front and rear winker lamps 9c, 9d is flashing.

At this time, the front left and right winkers 3 have respective lit and flashing states thereof, which will now be described with reference to FIGS. 4A, 4B, 4C.

Figure 4A:
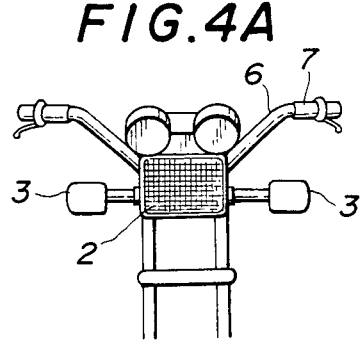
FIGS. 4A, 4B, and 4C are illustrations showing the application, a lit state, and a flashing state of left and right front winkers of the winker device, respectively.

FIG. 4A is a front view of the motorcycle 1, in which the right of the drawing corresponds to the left of the motorcycle 1.

Figure 4B:
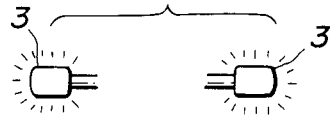

As shown in FIG. 4B, while the winker switch 7 is left off, the left and right position lamps 10a, 10b are both kept lit and hence both the left and right front winkers 3 are put in the lit state, thereby indicating the transverse width of the motorcycle 1.

Figure 4C:
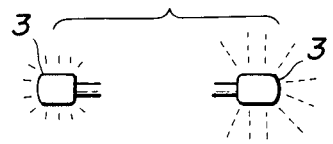

Then, as shown in FIG. 4C, when the winker switch 7 is once turned on to the left, the left position lamp 10a becomes extinct, leaving lit the right position lamp 10b only, and the left front and rear winker lamps 9c, 9d start flashing, so that the left front winker 3 as well as the left rear winker 5 is put in the flashing state.

Similar effects will be achieved also when the operating element 7a is operated to the right, provided that both the position lamp switch 16 and the select switch 17 have respective actions thereof reversed in the direction in comparison with the case of the left turning.

In a completed state of such turning or cornering, the steering angle sensor 19 has a cornering completion signal output therefrom to be input to the winker control unit 12, causing the "high" level voltage to appear at the output terminal 12c, whereby the winker relay 15 is stopped and the coil 18a is energized to close the contact 18b. As a result, the left front and rear winker lamps 9c, 9d stop flashing, and the left and right position lamps 10a, 10b are both lit.

Referring again to FIG. 2, when a cornering is stopped in the way after the operating element 7a has been operated either to the left or right to start the cornering, then the operating element 7a is to be operated to the front to be put in a temporary contact with the contact 7d to thereby temporarily provide the "zero" level voltage to the input terminal 12b of the control unit 12, whereby the winker relay 15 is stopped or cancelled of the function, that is, subjected to the aforesaid manual cancellation. As a result, the contact 18a becomes close, making an original state of the winker device. The control unit 12 is responsible for no automatic cancellation.

The mechanical constitution of the winker switch 7 will now be described, as well as respective relations thereof to the position lamp switch 16, and the select switch 17, with reference to FIGS. 5A, 5B, 5C.

Figure 5B:
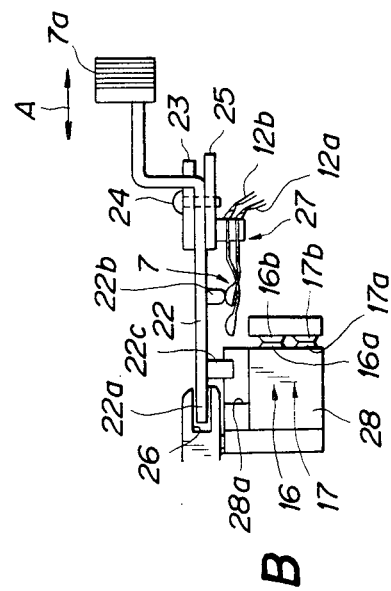
FIGS. 5A, 5B, and 5C are top, side, and partial detailed views of a switch unit of the winker device.
Figure 5C:
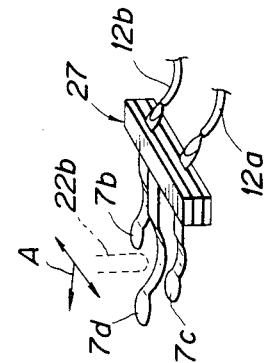
Figure 5A:
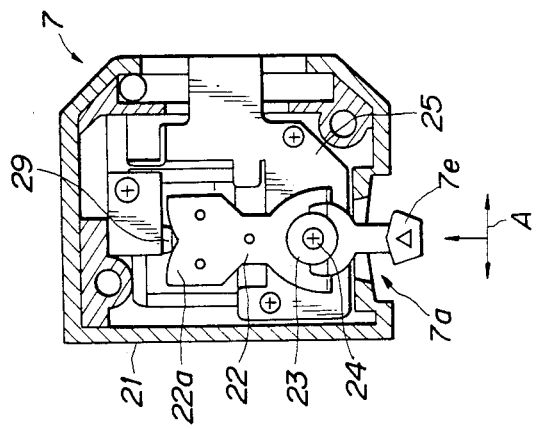

As shown in FIG. 5A, in which the top of the drawing corresponds to the front of the motorcycle 1, the winker switch 7 includes a switch box 21 accommodating therein the operating element 7a, which comprises a conductive operation lever 22 accommodated in the box 21 and electrically grounded and a non-conductive operation nob 7e connected to the rear part of the lever 22 and exposed rearwardly of the box 21. In the box 21, the lever 22 is counterpressed by a disc 23 and rotatably mounted on a fixed plate 25 with a screw 24, while being resiliently biassed at a front end part 22a thereof rearwardly of the motorcycle 1 with a ball 29, which is resiliently supported in a slit 26 of the box 21 with a spring, as shown in FIG. 5B. In the lever 22 is formed a hole (not shown) elongated in the longitudinal direction of the lever 22, for providing therethrough the screw 24. The operating element 7a is therefore movable in the three directions designated at A, that is, laterally to the left and right and, when pressed, longitudinally to the front of the motorcycle 1, and normally biassed to be restored to an original position thereof, that is, the neutral position, with the spring, when released from any operation thereto.

As seen from FIG. 5B, the operation lever 22 is provided on the lower face thereof with a rear projection 22b and a front projection 22c. The rear projection 22b, which is electrically conductive, is located in front of a non-conductive terminal support 27 fixed to the lower face of the plate 25, which plate has the contacts 7b, 7c, 7d of the winker switch 7, as shown in FIG. 5C. On the other hand, the front projection 22c, which is electrically non-conductive, is disposed so as to confront a recess 28a formed in a non-conductive mobile member 28, which member is provided with the respective mobile contacts 16a, 17a of the position lamp switch 16 and the select switch 17. Associated wiring to the contacts 16a, 16b, 17a, 17b are not shown.

Incidentally, in FIG. 5B, which is a left side view of an essential part in the switch box 21 of FIG. 5A, the terminals 16c, 17c are positioned at the opposite side of the terminals 16b, 17b with respect to the lever 22, thus being not shown.

In the foregoing constitution, when the operating element 7a is laterally operated to the right or left, the "low" level voltage is applied to the control unit 12 through the rear projection 22b cooperating with the contact 7b, 7c, while the mobile member 28 is moved by the front projection 22c to properly select respective switch positions of the position lamp switch 16 and select switch 17.

Moreover, when operated to the front, the operating element 7a brings the rear projection 22b into temporary contact with the contact 7d, thereby effecting the manual cancellation. In such state, the front projection 22c is correspondingly moving with a sufficient play left in the recess 28c, thus giving no effects to the switches 16, 17.

Further, in the above embodiment, the winker switch 7, the position lamp switch 16, and the select switch 17 may preferably be joined into a unit of a small-sized compact design.

Figure 6:
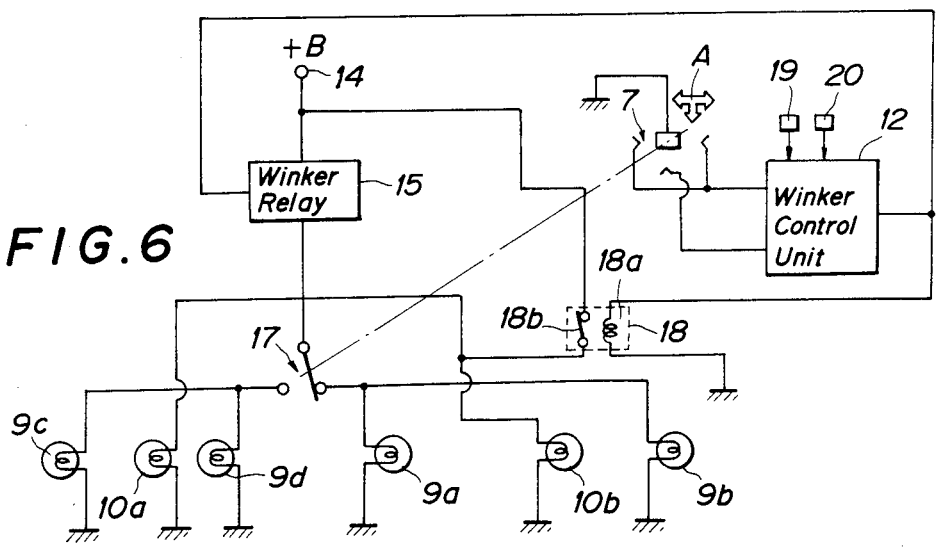
FIG. 6 is a circuit diagram of a winker device according to a modified example of the above embodiment.

There will be described hereinbelow a modified example of the preferred embodiment of the invention, with reference to FIG. 6, in which like parts are designated at like reference characters in relation to the preferred embodiment.

In the modified example, which employs no position lamp switch, left and right front position lamps 10a, 10b are fed with electric power from a power supply terminal 14 through no more than a contact 18b of a position lamp relay 18, whereas other constitution is substantially the same as that of the preferred embodiment. According to the modified example, the left and right position lamps 10a, 10b are permitted to be concurrently extinguished, when either right front and rear winker lamps 9a, 9b or left front and rear winker lamps 9c, 9d are caused to flash.

As will be understood from the foregoing description, according to the present invention, there is provided a winker device including left and right winkers each respectively having disposed therein a position lamp as well as a winker lamp, in which, in a travelling state, the position lamp to be constantly lit at both the left and right is extinguished at the same side as the winker lamp is caused to flash, thus effectively saving the power consumption.

Incidentally, in the preferred embodiment, the winker device is adapted for the motorcycle as a vehicle. In this respect, such vehicle may be of any stradling type.

Moreover, in the embodiment, a winker lamp and a position lamp are combined together to constitute a single lamp in a front winker. However, such lamps may be constituted with separate bulbes.

Further, instead of the position lamp relay 18, there may be employed a reed switch, a contact-less relay composed such as of transistors, an optical relay taking advantage of a light beam, or the like.

Furthermore, it will be understood that the present invention is applicable also to a winker device including a manual canlellation unit instead of a winker control unit having both automatic and manual control modes for winker cancellation. Such a manual cancellation unit may be constituted by removing the steering angle sensor 19 and the travelling distance sensor 20 from the arrangement of the aforesaid embodiment.

Still more, in the embodiment, differently from the left and right front winkers 3 with the left and right position lamps 10a, 10b, the left and right rear winkers 5 have no position lamps. In this respect, there may be preferably provided left and right rear position lamps in the winkers 5, respectively. Besides, there may be employed either front or rear pair of winkers each having a position lamp as well as a winker lamp.

Yet more, as a matter of course, there may be employed a manual switch solely adapted for a left-right selection of the position lamps 10a, 10b.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrective. The scope of the invention is indicated by the appended claims rather than by the foregoing description.

We claim:

1. A winker device, comprising:
a left winker having:
  a left winker lamp adpated for a turning to the left; and
  a left position lamp;
a right winker having:
  a right winker lamp adapted for a turning to the right; and
  a right position lamp;
a winker relay connected to a power source, for intermittently supplying an electric power to said left and right winker lamps;
a first select switch interposed between said winker relay and said left and right winker lamps, for connecting said winker relay constantly to either of said left and right winker lamps;
a position lamp relay disposed between said power source and said left and right position lamps, for connecting and disconnecting said power source to and from said left and right position lamps;
winker switch means for supplying:
  in accordance with a manual operation, a first signal to said winker relay and said position lamp relay;
  said first signal representing either of said turning to the left and said turning to the right;
  in accordance with at least another manual operation, a second signal to said winker relay and said position lamp relay; and
  said second signal representing a completed state of said turning; and
said first select switch being operatively connected to said winker switch means to connect said winker relay, in accordance with said manual operation giving said first signal of said winker switch means, to either of said left and right winker lamps.

2. A winker device according to claim 1, wherein:
said winker relay is adapted for starting, when said first signal is supplied from said winker switch means, and stopping, when said second signal is supplied, intermittently supplying said electric power through said first select switch to either of said left and right winker lamps as selected by said first select switch.

3. A winker device according to claim 2, wherein:
said position lamp relay is adapted to open, when said first signal is supplied from said winker switch means, and to close, when said second signal is supplied.

4. A winker device according to claim 3, wherein:
said first signal and said second signal are continuously supplied from said winker switch means, exclusively to each other.

5. A winker device according to claim 4, wherein:
there is disposed, between said power source and said left and right position lamps, a second select switch comprising:
  a first position terminal connected to one of said left and right position lamps;
  a second position terminal connected to the other of said left and right position lamps; and
  a mobile contact for always connecting either of said first and second position terminals to said power source; and
said second select switch is operatively connected to said winker switch means and adapted for connecting said power source to either of said left and right position lamps in accordance with said manual operation giving said first signal of said winker switch means.

6. A winker device according to claim 5, wherein:
said position lamp relay is disposed between said first and second position terminals of said second select switch.

7. A winker device according to claim 6, wherein:
said winker switch means comprises:
  an operating element adapted for said manual operations;
  said operating element being earthed; and a winker switch having a first winker switch terminal adapted to be connected to said operating element to supply said first signal at a low level to said position lamp relay, when said operating element is subjected to either of said manual operations.

8. A winker device according to claim 7, wherein:
said winker switch means further comprises a winker control unit interposed between said winker switch and said winker relay and said position lamp relay;
said winker control unit has a first input terminal connected to said first winker switch terminal, and an output terminal connected to said winker relay and said position lamp relay; and
said winker control unit is adapted for supplying said first signal at said low level from said output terminal, when a low level signal is input from said first winker switch.

9. A winker device according to claim 8, wherein:
said winker switch further has a second winker switch terminal manually connectable to said operating element;
said winker control unit further has a second input terminal connected to said second winker switch teminal; and
said winker control unit is adapted for supplying said second signal at a high level from said output terminal, when said low level signal is input from said second winker switch terminal.

10. A winker device according to claim 9, wherein:
said winker switch further has returning means for automatically returing said operating element, when said manual operation of said operating element is completed, to a neutral position free from contact both said first and second winker switch terminals; and
said winker control unit is adapted for, when said low level signal is once input to each of said first and second input terminals, continuously supplying from said output terminal said first signal and said second signal in correspondence to said input terminals.

11. A winker device according to claim 10, wherein:
said winker control unit is provided with sensor means for detecting said completed state of said turning; and
said winker control unit is adapted for supplying said second signal from said output terminal, when said completed state of said turning is detected by said sensor means.

12. A winker device, comprising:
a left winker having:
 a left winker lamp adpated for a turning to the left; and
 a left position lamp;
a right winker having:
 a right winker lamp adapted for a turning to the right; and
 a right position lamp;
a winker relay connected to a power source, for intermittently supplying an electric power to said left and right winker lamps;
a first select switch interposed between said winker relay and said left and right winker lamps, for connecting said winker relay constantly to either of said left and right winker lamps;
a position lamp relay disposed between said power source and said left and right position lamps, for connecting and disconnecting said power source to and from said left and right position lamps; and
winker switch means for supplying:
 in accordance with a manual operation, a first signal to said winker relay and said position lamp relay;
 said first signal representing either of said turning to the left and said turning to the right;
 and a second signal to said winker relay and said position lamp relay; and
said second signal representing a completed state of said turning;
wherein:
when said first signal is supplied from said winker switch means, at least either of said left and right position lamps is made extinguished in correspondence to said first signal and, when said second signal is supplied from said winker switch means, said either of said left and right position lamps, as extinguished.

* * * * *